April 12, 1955

J. J. KOWALIK 2,706,032

HARVESTING CONVEYING MECHANISM

Filed Aug. 5, 1952

INVENTOR.
John J. Kowalik
BY
Paul O. Pippel
Atty.

April 12, 1955

J. J. KOWALIK 2,706,032

HARVESTING CONVEYING MECHANISM

Filed Aug. 5, 1952

INVENTOR.
John J. Kowalik
BY Paul O. Pippel
Atty.

April 12, 1955 J. J. KOWALIK 2,706,032
HARVESTING CONVEYING MECHANISM
Filed Aug. 5, 1952 5 Sheets-Sheet 3

INVENTOR.
John J. Kowalik
BY Paul O. Pippel
Atty.

April 12, 1955   J. J. KOWALIK   2,706,032
HARVESTING CONVEYING MECHANISM
Filed Aug. 5, 1952   5 Sheets-Sheet 4

INVENTOR.
John J. Kowalik
BY
Paul O. Pippel
Atty.

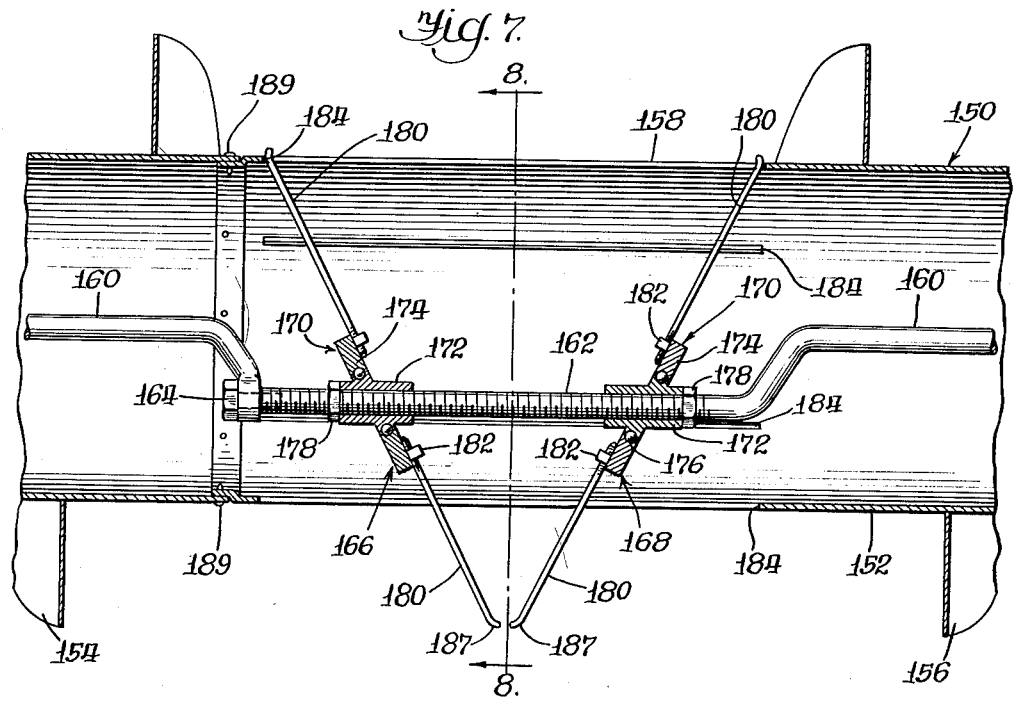
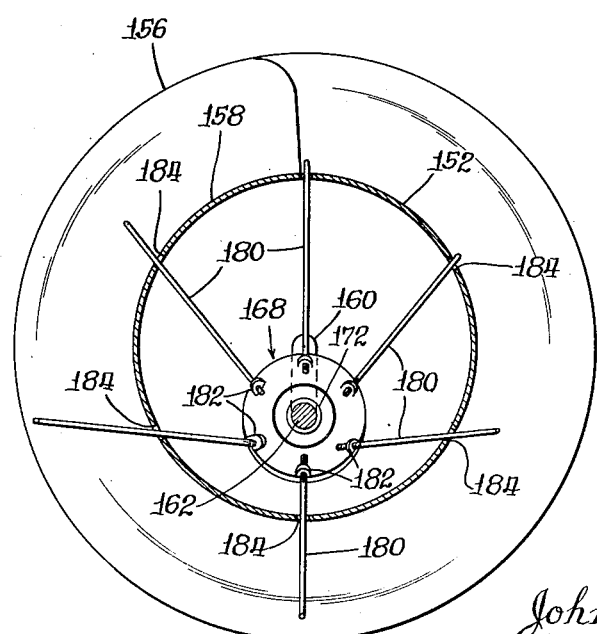

United States Patent Office 2,706,032
Patented Apr. 12, 1955

2,706,032

HARVESTING CONVEYING MECHANISM

John J. Kowalik, Chicago, Ill., assignor to International Harvester Company, a corporation of New Jersey Application August 5, 1952, Serial No. 302,729

11 Claims. (Cl. 198—104)

This invention relates to harvester-threshers of a type having a relatively narrow thresher section and a relatively wide harvester platform and cutter at the forward end thereof, and more particularly to an improved mechanism for conveying the grain cut in front of the thresher rearwardly and from the harvester platform at opposite sides of the thresher laterally and thence rearwardly onto a thresher conveyor which elevates the crop into the thresher compartment.

A general object of the invention is to devise a novel conveying mechanism which at the confluence of the laterally flowing streams of crops is effective to redirect such flow rearwardly to the thresher conveyor and also move the grain cut directly in advance of the thresher conveyor thereto. It will be appreciated that although the invention is shown applied to a harvester-thresher wherein the lateral feed is directed from opposite ends of the platform toward the center, the invention is equally applicable to an arrangement wherein the thresher is at an end of the platform.

The invention contemplates the provision of a conveyor comprising opposed augers extending throughout the length of the platform, the core of the augers at adjacent ends thereof extending across the entire width of the thresher conveyor and enclosing gathering means including a series of fingers extending through perforations in the core, the fingers being arranged to grasp and carry the crop rearwardly under the core and being retractable through the perforations to disengage from the crops behind the auger core and extensible through the perforations to engage with the crops on the forward and underside of the core.

More specifically, the invention contemplates a gathering mechanism including opposed cooperating components, each of which comprises a series of fingers operating through the perforations in the auger core, the fingers of each component being inclined in the direction of the flow of the crops from the end of the adjacent auger such that maximum and unobstructed flow of the crops to in front of the thresher conveyor is afforded and at the same time sufficient engagement of the fingers with the crops is obtained to carry the crops under the core to the thresher conveyor.

In addition, the invention comprehends an arrangement of the fingers in a manner to prevent its pushing the crop cut directly thereahead off the platform and matting it to the ground.

A still further object is to devise a simple and relatively inexpensive gatherer mechanism which may be incorporated in the present auger conveyors with minimum modification.

A different object is to provide such a gathering mechanism which will gather the crops in front and from the sides, and sweep it to the thresher conveyor and spread it relatively evenly across the width of the thresher intake whereby obtaining a more uniform feed into the thresher and consequent materially improved threshing action.

Another important object is to provide a simple drive for the fingers in the form of wobbles which affect movement of the fingers generally longitudinally of the augers in extension and retraction whereby the movement of the fingers corresponds with the flow of the material from opposite ends of the augers on the forward and underside of the core such that the flow is unimpeded and spilling of the crop over the front edge of the platform is eliminated.

A still further object is to modify the contour of the portion of the core between the adjacent ends of the augers so that it effects a stripping action with respect to the fingers.

A still further object is to arrange the fingers of the opposed components in so that they move toward each other at the forward and underside of the auger core and effect a grasping action on the crops entered therebetween, the grasping action being obtained by moving the fingers in converging orbits, the convergence occurring along the forward and underside of the core so that the lateral spread of the fingers along the forward and underside of the core gradually diminishes and thus presents the smallest area of interference to the rearward flow of the crops which are cut directly in front of the thresher conveyor.

These and other objects of the invention will become more apparent from the specification and drawings, wherein.

Figures 5, 6:
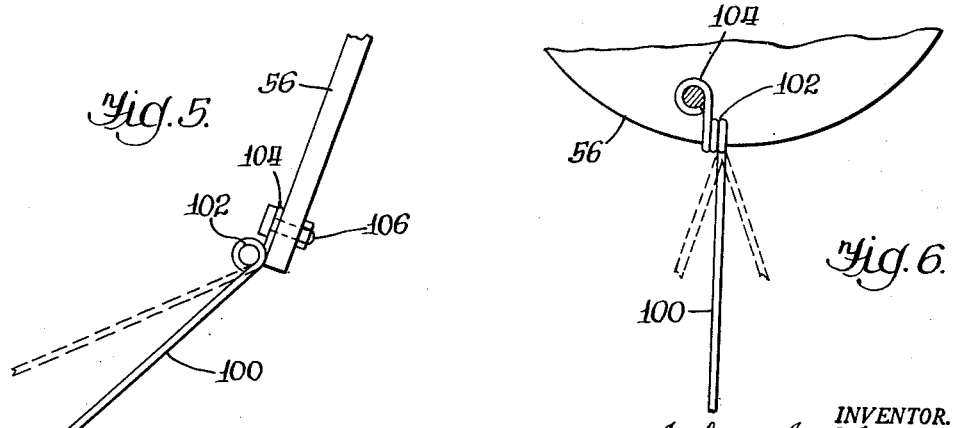
Figure 4:
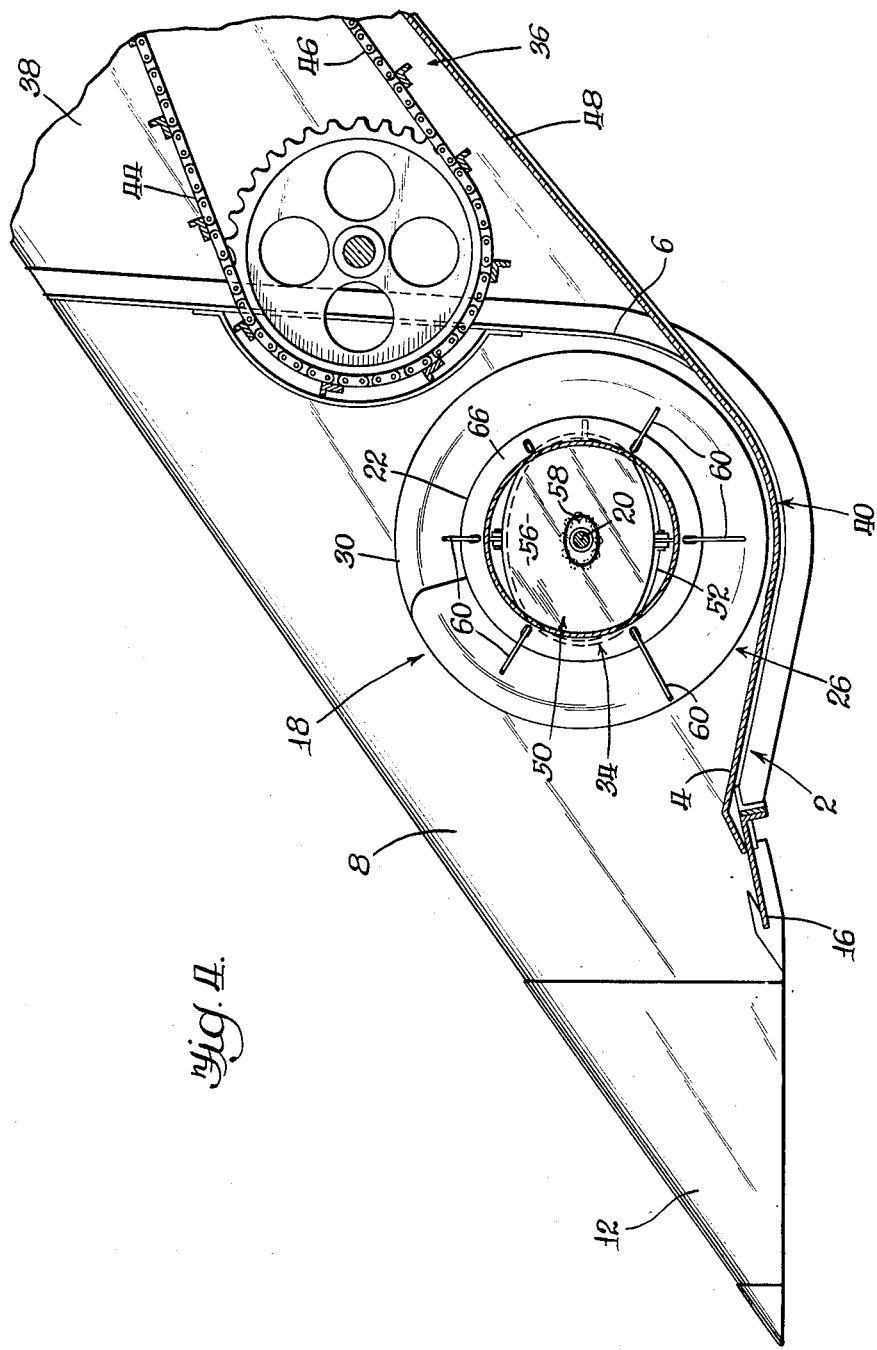
Figure 4 is an enlarged fragmentary transverse vertical sectional view taken substantially on the line 4—4 of Figure 1.

Figures 5 and 6 are fragmentary views illustrating a modification of the invention, Figure 5 being a fragmentary edge view of a modified wobble and tooth construction and Figure 6 being a side elevational view thereof; and Figures 7 and 8 illustrate a further embodiment, Figure 7 being a fragmentary axial section and Figure 8 a transverse section taken substantially on line 8—8 of Figure 7.

Referring to Figures 1 through 4, the invention is shown in conjunction with a harvester platform generally designated 2 for use with combines and the like. The platform includes a substantially flat bottom wall forwardly open floor portion 4 and a substantially vertically disposed back wall 6. The floor and back wall of the platform are joined by end walls 8 and 10 which have forwardly projecting end grain dividing points 12 and 14. The forward edge of the harvester platform 2 is equipped with a grain cutting mower or sickle 16.

Figure 1:
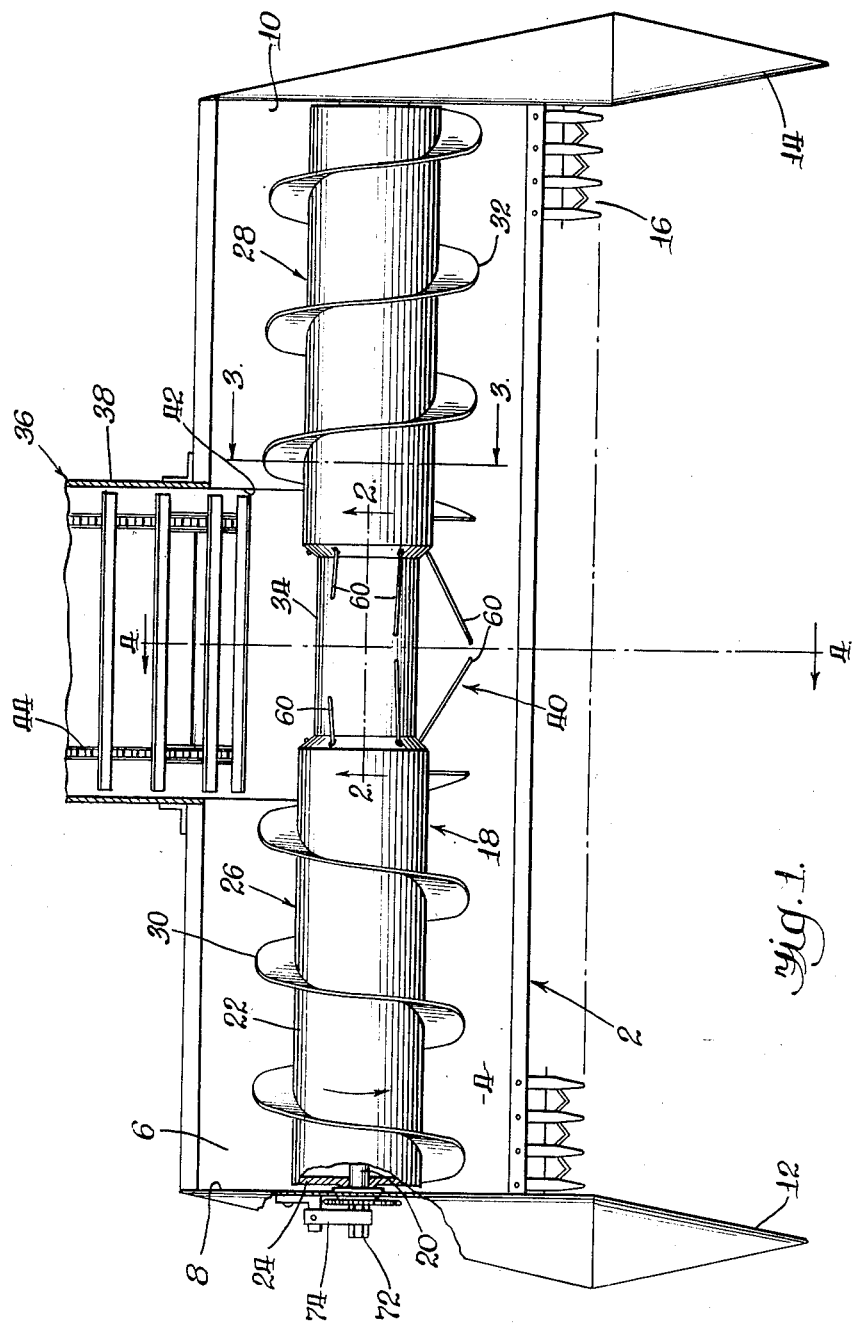
Figure 1 is a fragmentary top plan view with parts in section of a platform of a harvester-thresher incorporating the auger conveyor of the instant invention.
Figure 2:
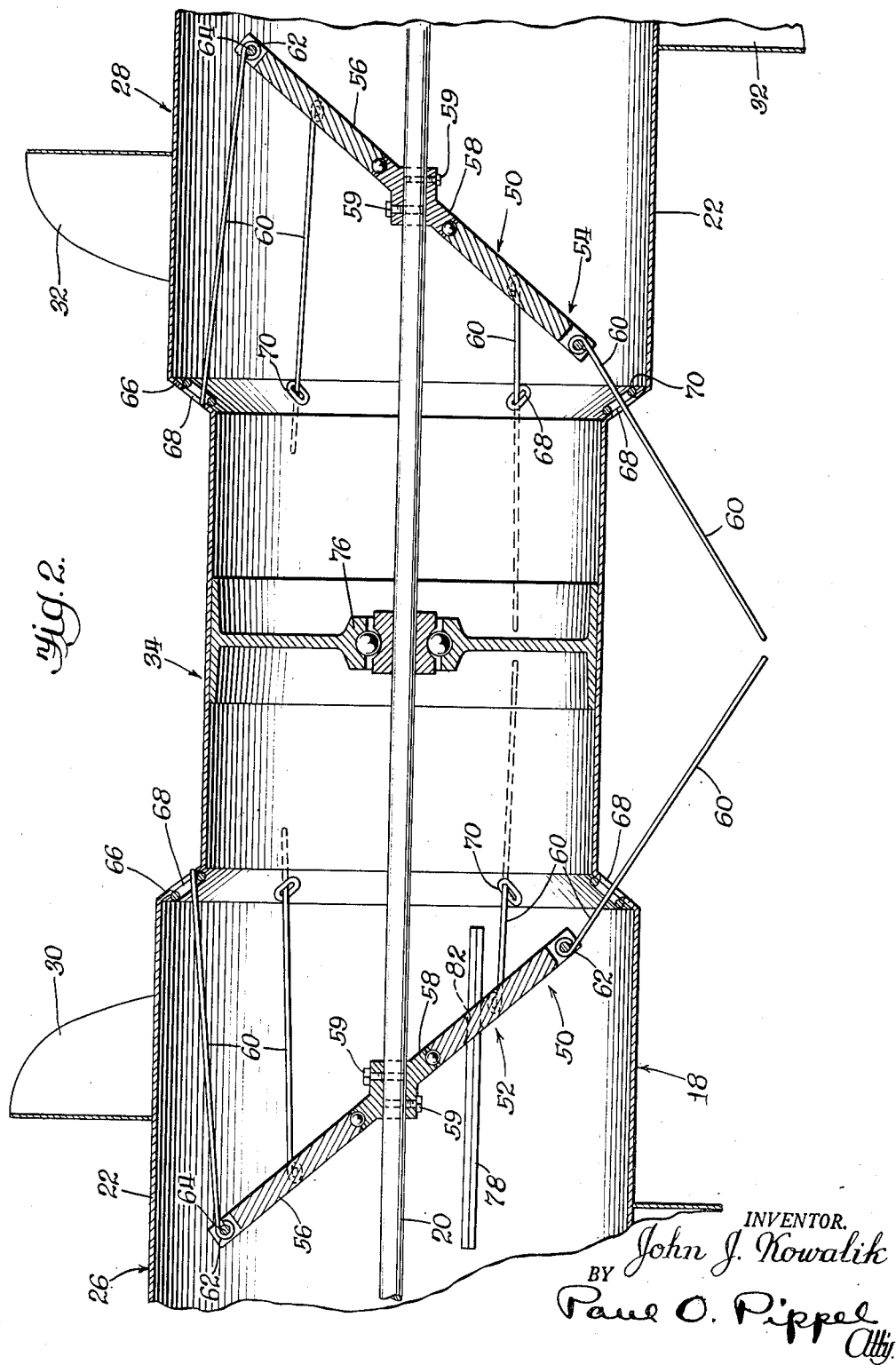
Figure 2 is an enlarged vertical axial sectional view of the gathering component taken generally on the line 2—2 of Figure 1.
Figure 3:
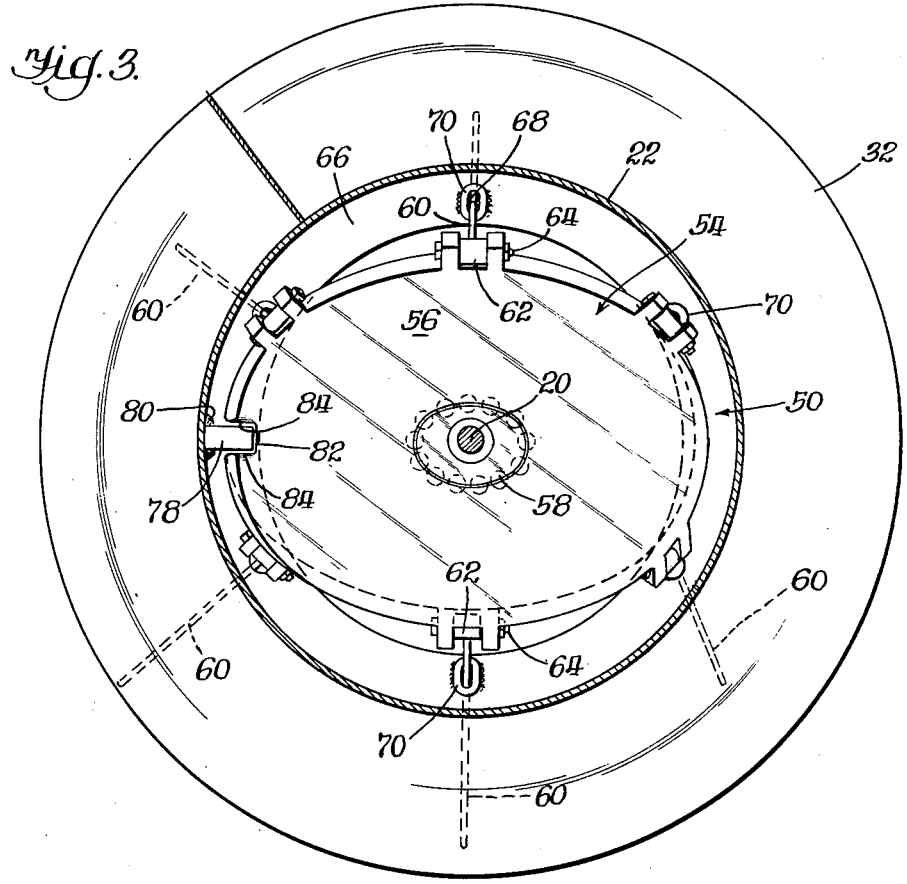
Figure 3 is an enlarged fragmentary transverse sectional view taken substantially on the line 3—3 of Figure 1.

The platform further comprises a centrally discharging straight through auger generally designated 18, the auger comprising a center stationary supporting shaft 20 which is generally supported in bearings in the end walls 8 and 10 of the platform. The auger comprises a tubular core 22 disposed about the shaft 20 and supported at each end by a bearing 24 whereby the core is rotatable with respect to the shaft. The portions of the auger 18 at the opposite end lengths thereof generally designated 26 and 28 are provided with reversely arranged screw flights 30 and 32 respectively and it will be seen that in order to feed the crops toward the center, the flights at the left half of the auger 18 as seen in Figure 2 are spiraled in a left hand manner and those on the right half in a right hand manner whereby as the auger rotates with its forward side moving downwardly the crop engaged by the flights after the grain is cut by the sickle on forward movement of the implement through a field of standing grain, the grain continuously falls rearwardly which may be assisted by a reel as conventional, if desired, onto the auger conveyor 18 and the flights 30 and 32 will cause the grain to flow laterally or axially toward the center or intermediate section 34 of the auger, which is located in alignment with the harvester component generally designated 36, said harvester component comprising a housing 38 which is joined to the central zone 40 of the platform, that is to the rear panel and bottom panel and communicates with the platform through an opening 42 in the rear panel of the platform. The housing 38 may enclose an undershot conveyor 44 which may have its lower flight 46 positioned to move above a bottom wall 48 of the housing said bottom wall inclining upwardly rearwardly and leading into the threshing mechanism and at its forward lower end extending beneath the center section of the core of the auger and forming the central or intermediate zone of the auger platform.

The center section of the core of the auger encloses a gathering mechanism generally designated 50.

The gathering mechanism 50 includes a pair of opposed cooperatively arranged substantially identical components or sections generally designated 52 and 54. Each component includes a wobble member or plate 56 which is rotatably journaled or mounted on the stationary shaft 20 on a transverse axis disposed angularly with respect to the axis of rotation of the auger which in the instant case is the shaft 20. More specifically, the plate 56 is mounted on a thrust bearing 58 which is adjustably fixed to the stationary shaft 20 as by studs 59. It will be seen that the axes of rotation of the wobble plates 56 of the opposed components 52 and 54 converge toward the center line of the thresher conveyor as represented by the section line 4—4 of Figure 1. It will be understood that the angularity of the axes of rotation of the wobble plates may be varied in accordance with desired requirements so that each point on the periphery of each wobble plate may move a certain distance longitudinally of the auger. About the outer periphery of each wobble plate or bearing are secured the inner ends of a series or set of fingers 60, 60 these fingers being preferably provided at their inner ends with eyes 62 which may be pivoted on bolts 64 on axes which extend as chords with respect to the plate. Of course, if desired, a universal connection of any conventional design may be utilized between each finger and the plate, in lieu of the ear shown.

The center section of the core is preferably slightly narrowed to accommodate the increased crop volume and comprises generally bell-shaped end portions 66, 66 which at their outer extremities merge into the adjacent terminus of the core 22. The bell-shaped portions 66, 66 are provided with a series of circumferentially spaced perforations 68, 68 through which extend the fingers on the adjacent plate. The perforations 68, 68 may each be provided with hardened bushings in the form of oval rings 70, 70 and these rings may be slightly larger than the diameter of the fingers to accommodate convenient movement thereof longitudinally with respect to the auger as well as extension and retraction with respect to the core. It will be understood that any other universal mounting may be provided in lieu of bushings 70, 70 through which the fingers may project in order to accommodate the various movements of the fingers in extention and retraction. It will be noted that the perforations are spaced farther from the shaft 20 than the points of pivot of the inner ends of the fingers with the wobble plates. This results in the fingers when being moved in extension out of the core to move to a position closer to the perpendicular with respect to the axis of rotation of the auger so as to develop an extensive sweep or outward reach.

The shaft 20 may be provided at either end with a nonround preferably hexagonal portion providing flat surfaces 72 to accommodate convenient engagement by a wrench and this portion may be engaged by an end of a cam or flat cantilever spring 74 which may be suitably secured to the related end wall of the platform whereby the shaft is releasably locked and rotatable in order to change the region of convergence of the plates by rotating the cam bearings, the springs 74 in combination with the hexagonal portion 72 affording a convenient releasable interlock or detent means for maintaining the shaft in adjusted position.

It will be noted that the center section 34 of the core may, if desired, be provided with a bearing 76 which may ride on the shaft and thus afford an additional support for the core.

Each plate 56 is keyed to the core 22 by a generally axially extending key 78 welded as at 80 to the inner side of the related core portion 22. The key 78 extends radially inwardly of the core into a generally radial slot 82 in the periphery of the related plate 56 between opposed generally radial opposedly convexed edges 84, 84 of the slot and in loose contact therewith whereby the plate is positively driven by the core. The engaging edges of the slot and flat sides of the key accommodate angling of the plate axially of the auger. Of course, the key is long enough axially of the core to prevent withdrawal of the key from the slot throughout the longitudinal movement of the plate axially of the core. It will be appreciated that any other mechanical variant to interlock the plate and core may be used.

In Figures 5 and 6, the key is prefixably eliminated and each tine 100 is formed of spring steel provided at its inner end with a torsion spring portion 102 extending axially generally tangentially of the periphery of the related plate 56 and having an eye 104 formed at one end which lies against one side of the plate 56 and is bolted thereto as by a bolt 106. The spring 102 is biased to urge the tine to a position toward the radial with respect to the plate and thus presses tightly against the outer edges of the apertures 68 and thus holds the plate to positively rotate with the core.

Referring now to the embodiment shown in Figures 7 and 8, the auger 150 generally corresponds to the auger 18 and comprises a cylindrical core 152 with reversely spiraled flights 154 and 156 terminating at opposite ends of the center portion 158 of the auger. The auger is supported at each end, as in the previous embodiment, through the medium of a center shaft 160 which extends centrally through the auger core 152 and in the area of the center portion 158 comprises a radially offset eccentric or crank portion 162. The shaft 160 is separable at one end of the portion 162 by means of a stud 164 to admit mounting and demounting a pair of opposed rotatable sweeper or finger gathering assemblies 166 and 168.

Each assembly 166 and 168 comprises a central bearing 170 including inner and outer race member 172 and 174 relatively rotatable through the medium of plurality of ball bearings 176 suitably confined between complementary raceways at opposing outer and inner peripheries of associated members 172 and 174 confining the bearing members 176 therebetween. Each member 172 is in a form of a hub threaded on the portion 162 and locked in position thereon by means of a locking nut 178 threaded on portion 162 and butted up against the end of the portion 172.

It will be noted that related members 172 and 174 constitute a wobble plate, the axes of rotation of which are disposed diagonally or angularly with respect to the longitudinal axes of the shaft 160 and the parallel portion 162. Preferably, the wobble assemblies are arranged so that their axes of rotation converge transaxially of the axis of rotation of the auger 150.

Each wobble assembly 166 and 168, in addition to the plate or cam construction comprises a series of radially outwardly extending fingers 180, which, at their inner ends, are suitably connected to the related structure 170 as by threading into eyes 182 provided in the outer members 174. The fingers 180 may be formed of spring steel and the inner ends may be split and slightly diverged to lock in place. The fingers 180 extend through longitudinal slots 184 provided in the center portion 158 of the core 152 of the auger 150 and it will be readily appreciated, especially from a consideration of Figure 8, that upon rotation of the auger, the shaft 160 remaining stationary, the fingers, 180, 180 of the respective wobble assemblies 166 and 168, in view of their rotation on inclined axes and eccentric relationship of their axes of rotation with respect to the axis of rotation of the auger 150, will be caused to move longitudinally of the auger and simultaneously in extension and retraction. It will be understood that the shaft 160 is adjustably rotatable as the shaft 20 of the embodiment of Figure 1 and thus a determination may be made, at the will of the operator, as to the area of extension of the fingers as well as of the retraction thereof. For most efficient operation the shaft 160 will be set in such manner that the fingers will extend on the forward and under side of the auger which is adapted to rotate with its forward or leading side moving downwardly as shown by arrow in Figure 8 and in retraction on the back and top sides. It will be noted that with such a setting, the fingers 180, 180 move toward each other in convergence at the forward and underside of the auger and thus do not impede flow of the crop toward the center and at the same time present a minimum area on the forward side of the auger such as would impede movement of the crop under the auger which is being cut directly in front of the center section 158. As the fingers progress to the back side of the auger they are being retracted in the crop and at the same time move longitudinally of the auger away from each other and thus effect a spreading action on the crop over the floor of the chute therebehind as shown at 48 in Figure 4.

It will further be appreciated that the arrangement shown in Figures 1 through 4 operates in substantially the same manner, in that the fingers 60, 60 are moved in extension at the forward and underside of the auger generally longitudinally of the auger in accordance with the flow of the material toward the center section while, at the same time, effecting a grasping action between the opposed assemblies and on the back sides these fingers 60, 60 are being withdrawn from the crop while at the same time spreading it laterally across the width of the floor 48. In each of these embodiments the wobbles are driven by the auger and are rotatable on axes angularly related to the axis of rotation of the auger. The action of the fingers projecting and retracting with respect to the core is developed by the movement of the wobbles longitudinally of the auger. This movement is in accordance with the lateral flow of the crops or grain feeding from opposite ends of the auger and cause the fingers to function to redirect these laterally flowing streams transaxially of the auger and move the crop rearwardly to the conveyor which pulls the crop along the bottom wall 48 of the thresher housing into the threshing cylinder. It will be understood that the wobble plate assemblies or bearing members constitute control means for moving the fingers.

It will be noted in Figures 7 and 8 that the outer ends of the fingers 180, 180 are provided with transversely curved portions 187, 187 and these curved portions of the opposed assemblies extend toward each other whereby to obtain an effective grasp on the crop in extension and to obtain ready stripping of the fingers from the crop when the outer ends of the fingers retract through the respective slots 184.

It will be noted that the core 152 may be parted at one end of the portion 158 and the adjacent sections may telescope into each other and may be suitably interlocked by means of bolts or metal screws or any other convenient securing means such as shown at 189. This is adapted to facilitate removal of the wobble assemblies although, of course, the core 152 may be made of one piece and the assembly then could proceed by removing all of the fingers 180 from the eyes 182 prior to insertion or removal of the shaft and wobbles with respect to the core 152.

In Figures 1 through 4 the oval openings 68 may be elongated circumferentially of the core to accommodate circumferential angling, without flexing, of the fingers 60 in accordance with the disposition of the related wobble plate. In Figures 1 through 4, the fingers 60 are formed of flexible spring steel.

The core in Figures 1 through 4 may have a covered opening (not shown) at each wobble plate for assembly and disassembly purposes.

In Figures 5 and 6, the spring portion 102 accommodates universal flexing of the finger 100.

These variations are recited so that it will be apparent that the embodiments shown are merely illustrative and not limiting of the invention and that many structurally equivalent variations are possible within the scope of the invention claimed.

I claim:

1. In combination with a housing having a crop receiving forward end opening and a harvesting platform extending across and sidewise from said housing wherein said platform is adapted to receive cut crops along its full length including that portion directly in front of said opening, a conveyor for moving the crops lengthwise on the platform toward said opening comprising an elongated structure including a tubular member rotatably supported above the platform, an auger flight on the tubular member, said member having perforations in the portion adjacent to the housing, a plurality of crop engageable fingers extending from said tubular member through the perforations, means responsive to rotation of said member for projecting the fingers into engagement with crops to sweep the crops rearwardly into the housing opening and for retracting the fingers inwardly of the tubular member to disengage the fingers from the crops behind the tubular member and including cam means for controlling inward and outward movement of the fingers through said perforations and directing said movement of said fingers in advance of and beneath said tubular member outwardly angularly generally in the direction of flow of the crops longitudinally of said member, said cam means supported from said structure and drivingly associated with said fingers and operative to position said fingers in extension from said tubular member in a plane transversely of said tubular member and at an angle to said platform beneath said tubular member so as to form a space between said platform and said fingers widening axially of said tubular member into the direction of flow of the crops along said conveyor structure toward said portion of said tubular member.

2. The invention according to claim 1 and further characterized in that said fingers are directly connected to said cam means and each includes a spring portion accommodating universal angling of the fingers through the related perforation as respects said cam means.

3. In a conveyor, an elongated material-receiving trough having a forward crop receiving edge and having walls extending lengthwise thereof, one of which walls is provided intermediate its ends with an outlet opening, an elongated tubular core extending lengthwise from end to end of the trough and across said outlet opening, said core including three co-axial portions rotatable in unison about a common axis, one of said portions being disposed in transverse alignment with said outlet opening and the other two portions extending respectively beyond the opening toward the ends of the trough, a pair of oppositely wound helical flights respectively on said two portions and terminating respectively at the outlet opening for moving crops axially of said core toward said one portion, said one portion having perforations therein, gathering means within said one portion and comprising a pair of opposed components, each component comprising a rotatable assembly journaled on the axis of rotation of the tubular core, each component having a set of fingers each projecting into an adjacent perforation, said components and the fingers thereon rotatable with said core for extension and retraction of the fingers through said perforations, the planes of rotation of said opposed components disposed in converging relationship in directions in advance and beneath said core whereby said fingers of respective components advance toward each other ahead and beneath said core and said fingers of each component defining an acute angle with a wall of said trough beneath the core and providing a space between the same widening axially toward the adjacent end of the trough to accommodate unrestricted movement of the crop toward said one portion.

4. The invention according to claim 3 and further characterized in that each assembly includes a disc pivotally connected about its outer periphery to the respective fingers on axes extending transversely of the axis of rotation of said core.

5. In a device of the class described, an elongated material receiving platform including a bottom wall with a forward crop receiving edge and a back wall extending upwardly from the bottom wall and having an outlet opening; an elongated tubular member extending lengthwise from end to end of said platform and across said outlet opening and rotatably mounted on said platform over said bottom wall, said member having integral end and intermediate portions, said intermediate portion disposed in advance of said outlet opening in transverse alignment therewith and said end portions extending respectively from said opening toward respective ends of said platform, a pair of oppositely wound helical flights respectively on said end portions and terminating at the intermediate portion for moving crops laid on said platform toward said intermediate portion; said intermediate portion having perforations therein, means in said intermediate portion for gathering the crops moving from opposite ends of said tubular member and directly in front thereof for moving said crops under said tubular member over said bottom wall and into said outlet opening and comprising a shaft extending axially through said tubular member and stationarily mounted on said platform, a pair of wobbles rotatably carried by said shaft in said tubular member adjacent opposite ends of said intermediate portion, said wobbles disposed in planes converging forwardly and beneath said intermediate portion, a set of fingers connected to respective wobble and extending through said perforations for rotation with said tubular member said wobbles operative to move said sets of fingers away from each other in retraction behind said tubular member and in planes converging ahead and beneath said tubular member toward each other in extension from said tubular member to grasp therebetween the crops immediately thereahead and to provide a gradually widening space with said bottom wall axially of said tubular member from approximately the center of said intermediate portion toward the adjacent end portion to accommodate the flow of crops from the related end portion to under said intermediate portion without spilling the crops over the forward edge of said bottom wall.

6. The combination according to claim 5 and said intermediate portion being of reduced diameter as respects to said end portions to provide additional space for the crops moving to said intermediate portion.

7. The combination according to claim 5 and said intermediate portion being of reduced diameter in comparison with said end portions and having bell-shaped ends merging with respective end portions, and said perforations for respective sets of fingers located in said bell-shaped ends.

8. The combination according to claim 5 and said intermediate portion being of reduced diameter in comparison with said end portions and having bell-shaped ends merging with respective end portions, and said perforations for respective sets of fingers located in said bell-shaped ends, and each finger articulatingly connected to the associated wobble on an axis generally parallel to the plane of the wobble.

9. The combination according to claim 5 and said intermediate portion being of reduced diameter in comparison with said end portions and having bell-shaped ends merging with respective end portions, and said perforations for respective sets of fingers located in said bell-shaped ends, and each finger articulatingly connected to the associated wobble on an axis generally parallel to the plane of the wobble, and the point of connection of each finger with its associated wobble being disposed radially inwardly of the perforation through which the finger extends.

10. The combination according to claim 5 and said intermediate portion being of reduced diameter in comparison with said end portions and having bell-shaped ends merging with respective end portions, and said perforations for respective sets of fingers located in said bell-shaped ends, and each finger connected to the associated wobble and having a resilient character for universal movement as respects thereto.

11. The invention according to claim 5 and said perforations comprising slots extending axially of said tubular member and said fingers of each set extending substantially radially from the associated wobble and fixedly connected thereto.

References Cited in the file of this patent

UNITED STATES PATENTS

| | | |
|---|---|---|
| 1,841,718 | Edwards | Jan. 19, 1932 |
| 2,328,278 | Innes | Aug. 31, 1943 |
| 2,424,148 | Carelock | July 15, 1947 |
| 2,529,180 | Oehler | Nov. 7, 1950 |
| 2,612,980 | Oehler | Oct. 7, 1952 |
| 2,617,518 | Anderson | Nov. 11, 1952 |
| 2,644,284 | Oberholtz et al. | July 7, 1953 |